(12) United States Patent
Yip

(10) Patent No.: US 12,105,796 B2
(45) Date of Patent: Oct. 1, 2024

(54) SYSTEMS AND METHODS FOR PROVIDING A CYBER INVESTIGATIVE PIPELINE

(71) Applicant: JPMORGAN CHASE BANK, N.A., New York, NY (US)

(72) Inventor: Timothy Weng Lup Yip, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 253 days.

(21) Appl. No.: 16/596,971

(22) Filed: Oct. 9, 2019

(65) Prior Publication Data

US 2021/0110032 A1   Apr. 15, 2021

(51) Int. Cl.
| | |
|---|---|
| *G06F 21/55* | (2013.01) |
| *G06F 16/25* | (2019.01) |
| *G06F 21/10* | (2013.01) |
| *G06F 21/54* | (2013.01) |
| *G06F 21/60* | (2013.01) |

(52) U.S. Cl.
CPC .......... *G06F 21/552* (2013.01); *G06F 16/258* (2019.01); *G06F 21/54* (2013.01); *G06F 21/602* (2013.01); *G06F 21/1078* (2023.08)

(58) Field of Classification Search
CPC .... G06F 21/552; G06F 21/602; G06F 16/258; G06F 21/54; G06F 2221/0775; G06F 21/577
See application file for complete search history.

(56) References Cited

U.S. PATENT DOCUMENTS

| | | | |
|---|---|---|---|
| 9,038,177 B1* | 5/2015 | Tierney | H04L 29/06891 726/23 |
| 9,922,192 B1* | 3/2018 | Kashyap | G06F 9/45533 |
| 11,005,860 B1* | 5/2021 | Glyer | H04L 63/1433 |
| 2014/0324517 A1* | 10/2014 | Harris | G06Q 10/0633 705/7.27 |
| 2018/0183827 A1* | 6/2018 | Zorlular | H04L 63/1416 |
| 2019/0098032 A1* | 3/2019 | Murphey | G06F 9/4498 |
| 2019/0207967 A1* | 7/2019 | Vashisht | G06F 16/285 |

(Continued)

OTHER PUBLICATIONS

Prasad Patil, "What is Exploratory Data Analysis?", Towards Data Science retrieved from https://towardsdatascience.com/exploratory-data-analysis-8fc1cb20fd15 on Aug. 28, 2021 (posted Mar. 23, 2018) (Year: 2018).*

(Continued)

*Primary Examiner* — Theodore C Parsons
(74) *Attorney, Agent, or Firm* — GREENBERG TRAURIG LLP

(57) ABSTRACT

Systems and methods for tracking, collecting, processing, enriching, analyzing and reporting on data in the context of cyber security investigations are disclosed. According to one embodiment, in an information processing apparatus comprising at least one computer processor, a method for conducting cyber investigations may include: (1) receiving initiation of an investigative workflow comprising contextual information including at least one of a case, a data asset, a subject, and a threat; (2) collecting digital evidence from the data asset; (3) processing the digital evidence into structured data; (4) staging and enriching the structured data; (5) analyzing the enriched structured data; and (6) generating at least one report based on the analysis.

14 Claims, 3 Drawing Sheets

(56) References Cited

U.S. PATENT DOCUMENTS

2020/0401696 A1\* 12/2020 Ringlein .................. G06N 3/08
2021/0011999 A1\* 1/2021 Bennett ................. G06F 21/567
2021/0084061 A1\* 3/2021 Elovici ............... H04L 63/1416

OTHER PUBLICATIONS

NIST, "What is EDA?", Engineering Statistics Handbook, available at http://www.itl.nist.gov/div898/handbook/eda/section1/eda11.htm, retrieved Sep. 3, 2021 from https://web.archive.org/web/20180108043149/http://www.itl.nist.gov/div898/handbook/eda/section1/eda11.htm (archived Jan. 8, 2018) (Year: 2021).\*

Quick, D., Choo, KK. (2018); Chapter 3 Data Reduction and Data Mining Frame-Work; In: Big Digital Forensic Data; Springer Briefs on Cyber Security Systems and Networks; Springer, Singapore; https://doi; org/10; 1007/978-981-10-7763-0_3 (Apr. 25, 2018) (Year: 2018).\*

Michael Cohen, Simson Garfinkel, Bradley Schatz, Extending the advanced forensic format to accommodate multiple data sources, logical evidence, arbitrary information and forensic workflow, Digital Investigation 6, S57-S68, 2009 Digital Forensic Research Workshop, Elsevier (Jun. 10, 2009) (Year: 2009).\*

\* cited by examiner

SYSTEMS AND METHODS FOR PROVIDING A CYBER INVESTIGATIVE PIPELINE

BACKGROUND OF THE INVENTION

1. Field of the Invention

The present disclosure generally relates to a distributed system for tracking, collecting, processing, enriching, analyzing and reporting on data in the context of cyber security investigations.

2. Description of the Related Art

In the event of a potential, or actual data breach, it is necessary to perform a forensics investigation to determine the risk and impact to the organization; and to identify control gaps for remediation. The wide range of systems, the different types of data and the disparate workflows that span across different controls introduces inefficiencies to existing forensic investigative methodologies and reduces the organizations' ability to adapt to changes in technology, business requirements and the cyber threat landscape.

SUMMARY OF THE INVENTION

Systems and methods for providing a cyber investigative pipeline are disclosed. According to one embodiment, in an information processing apparatus comprising at least one computer processor, a method for conducing cyber investigations may include: (1) receiving initiation of an investigative workflow comprising contextual information including at least one of a case, a data asset, a subject, and a threat; (2) collecting digital evidence from the data asset; (3) processing the digital evidence into structured data; (4) staging and enriching the structured data; (5) analyzing the enriched structured data; and (6) generating at least one report based on the analysis.

In one embodiment, the data asset may include an end point system comprising an agent that interacts with an end point detection and response system. The end point detection and response system may instrument the collection from the data asset and stores the collected data in an archive file format in an evidence storage system.

In one embodiment, the method may further include verifying the data by generating an acquisition cryptographic hash for the collected data; and storing the acquisition cryptographic hash in an evidence tracking system.

In one embodiment, the method may further include regenerating a cryptographic hash of the collected data on a subsequent access, and comparing the regenerated cryptographic hash to the acquisition cryptographic hash.

In one embodiment, the data may be enriched by adding contextual metadata to data objects in the data. The contextual metadata may include at least one of a file system artifact, an operating system artifact, and an application artifact.

In one embodiment, the step of analyzing the enriched structured data may include searching the data using exploratory data analysis.

In one embodiment, the step of analyzing the enriched structured data may include correlating data across data sets.

In one embodiment, the method may further include constructing an event timeline from time-series data.

In one embodiment, the method may further include identifying outliers in the data using statistical charting of the data.

In one embodiment, the method may further include identifying a suspicious event based on known indicators of compromise (IOCs).

In one embodiment, the method may further include identifying a suspicious event based on a known pattern.

In one embodiment, the method may further include using machine learning to identify suspicious events that contain unknown indicators and originate from unknown patterns.

According to another embodiment, a system for conducing cyber investigations may include a plurality of data assets, a plurality of virtualized containers, a SIEM platform, a data analytics platform, a data analysis pipeline, and an orchestration platform comprising at least one computer processor. The orchestration platform may receive initiation of an investigative workflow comprising contextual information including at least one of a case, at least one of the data assets, a subject, and a threat, and may collect digital evidence from the data asset. The virtualized containers may process the digital evidence into structured data. The SIEM platform and the data analytics platform may stage and enrich the structured data. The data analysis pipeline may analyze the enriched structured data. The orchestration platform may generate at least one report based on the analysis.

In one embodiment, the system may further include an end point detection and response system and evidence storage system, and the data asset may include an agent that interacts with the end point detection and response system, and the end point detection and response system instruments the collection from the data assets and stores the collected data in an archive file format in the evidence storage system.

In one embodiment, the orchestration platform may verify the data by generating an acquisition cryptographic hash for the collected data; and stores the acquisition cryptographic hash in an evidence tracking system.

In one embodiment, the orchestration platform may regenerate a cryptographic hash of the collected data on a subsequent access, and compares the regenerated cryptographic hash to the acquisition cryptographic hash.

In one embodiment, the data may be enriched by adding contextual metadata to data objects in the data, the contextual metadata comprising at least one of a file system artifact, an operating system artifact, and an application artifact.

In one embodiment, the report may include an event timeline from time-series data.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are related to distributed systems comprising a customizable enterprise technology stack that supports a full range of cyber security investigative workflows.

Embodiments may include workflows leveraging core components that implement processes that include the information capture for systems of record (SOR) and audit trails, the collection of digital evidence, the processing of the collected digital evidence to structured data and the enrichment of the structured data. Enriched data may be further processed through an analysis pipeline and be used to generate one or more reports.

Embodiments may be designed based on a micro-services architecture, where system components may be modular and application programming interface (API) instrumented. Workflows may be coordinated by an orchestration platform (OP) that can be extended to augment the workflows described herein, to create additional workflows that incorporate additional system components, etc. To achieve scalability, computationally intensive tasks are executed on a container platform, in virtualized container workloads.

Figure 1:
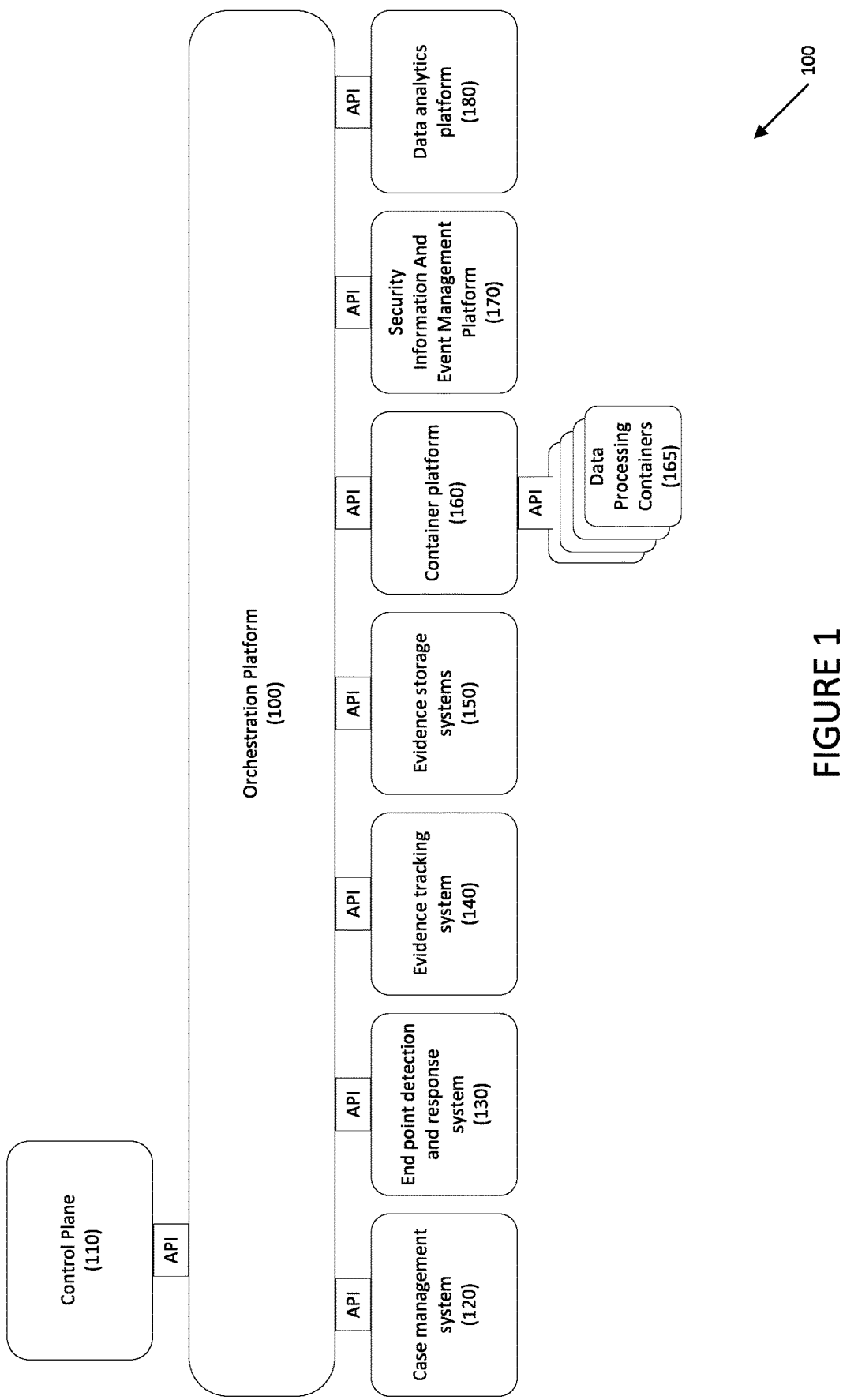
FIG. 1 is an exemplary component diagram that illustrates the interactions of the core components in the context of the core workflows according to one embodiment.

Referring to FIG. 1, a component diagram that illustrates the interactions of the core components in the context of the core workflows is provided according to one embodiment.

In one embodiment, a system for providing a cyber investigative pipeline is disclosed according to on embodiment. The system may include orchestration platform 100, control plane 110, case management system 120, end point detection and response system 130, evidence tracking system 140, evidence storage system(s) 150, container platform 160, security information and event management platform 170, and data analytics platform 180.

In one embodiment, orchestration platform (OP) 100 may be a software system that enables the instrumentation, configuration, coordination, and management of other computer systems, subsystems or software.

Control plane 110 may function as a management layer over OP 100 and the orchestrated components under it. It may track component states, run a global event handler, manage tasks, workflows, and scheduling, etc. In one embodiment, the control plane may interface with orchestration platform using one or more API.

Case management system (CMS) 120 may be a software system that serves as the SOR for case-related data, such as asset(s), subject(s), investigation notes, data collection(s), and other case details.

End point detection and response (EDR) system 130 may be a software system that may provide accessibility to compute end points, may enable the collection of digital evidence from target compute end points (e.g., hosts), and may enable the implementation of cyber security incident response containment actions based on specific vectors or specific hosts.

Evidence tracking system (ETS) 140 may be a software system that serves as the SOR for information on collected digital evidence.

Evidence storage system (ESS) 150 may be a storage solution that stores the collected digital evidence.

Container platform 160 may be a software system that hosts virtualized containers (e.g., data processing containers 165) that perform computational tasks in a scalable, elastic and customizable infrastructure platform. In one embodiment, container platform 160 may include data connectors (not shown) that connect to evidence storage systems 150, and data connectors (not shown) that connect to SIEM platform 170 and data analytics platform 180. In one embodiment, container platform 160 may provide containers that run code for specific data processing tasks.

In one embodiment, security information and event management (SIEM) platform 170 may be a software system that ingests data and provides functionality including event correlation, reporting, and alerting in the domain of cyber security incident response.

In one embodiment, data analytics platform 180 may be a software system that ingests data and provides functionality for exploratory data analysis, data correlation functionality and machine learning functionality.

In one embodiment, one or more API may be provided for case management system 120, end point detection and response system 130, evidence tracking system 140, evidence storage system(s) 150, container platform 160, security information and event management platform 170, and data analytics platform 180 to interface with orchestration platform 100. Similarly, container platform may interface with data processing container(s) 165 using one or more API.

Figure 2:
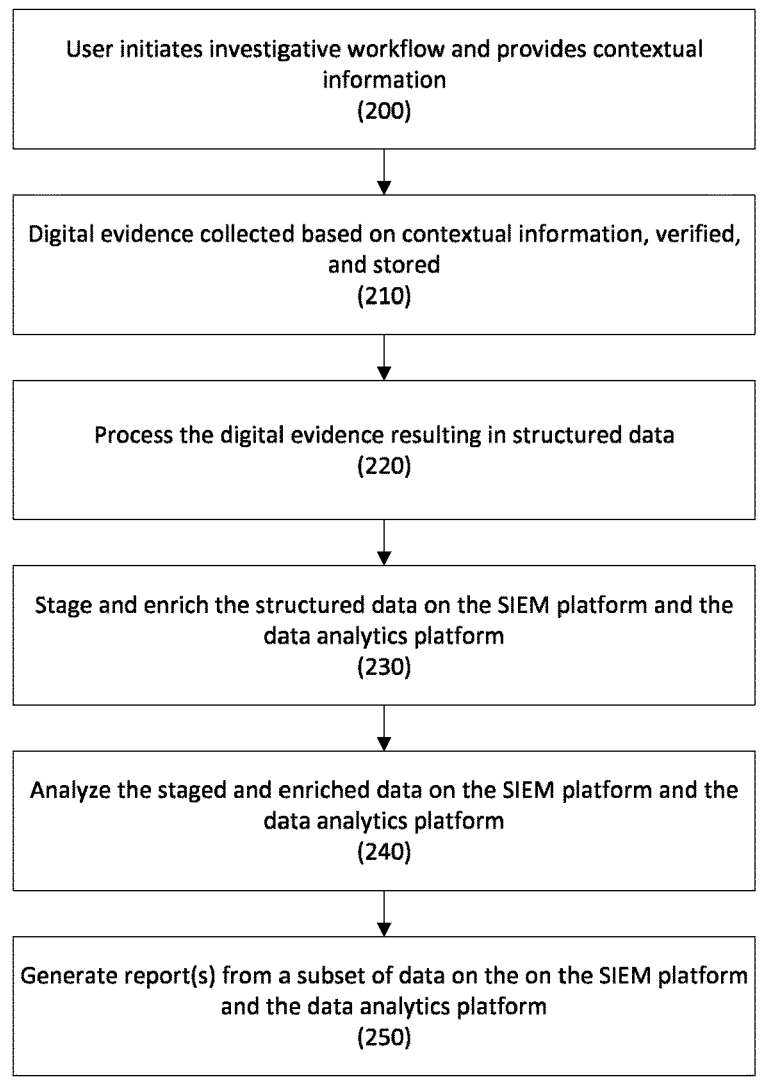
FIG. 2 depicts a method for conducing routine and end-to-end investigation flows according to one embodiment.

Referring to FIG. 2, a method for conducing routine and end-to-end investigation flows is provided according to one embodiment.

In step 200, a routine investigative workflow may be initiated by a human user. In one embodiment, the user may interact with a case management system via a web browser interface to initiate the workflow. As part of the workflow initiation, the user may provide relevant contextual information including, for example, the case, asset, subject, threat, and related events data.

In step 210, digital evidence may be collected from the assets as specified in the contextual information. In one embodiment, the assets that data is collected from may include end point systems that may have an agent installed to interact with an end point detection and response system. Based on the collection parameters, the EDR system may instrument the collection from the asset and may store the collected data in an archive file format in an appropriate evidence storage system.

As part of the verification process, a cryptographic hash (e.g., an acquisition hash) may be generated for the final collection archive upon completion of the collection. The acquisition hash functions like a "digital fingerprint" for the collection archive, and any change in data on the collection archive or the contents of the archive will result in a different cryptographic hash. The acquisition hash, timestamp of the collection completion and other relevant metadata may be stored as collection metadata in the evidence tracking system.

Subsequent verification tasks may involve, for example, regenerating the cryptographic hash of the collection archive and comparing it to the acquisition hash that was stored as metadata for the collection in the evidence tracking system.

In one embodiment, the output of step 210 may be considered to be digital evidence and may have an industry-standard digital evidence format (e.g., AD1, L01, etc.).

In step 220, the digital evidence may be processed. In one embodiment, the digital evidence may be processed by containers (e.g., virtualized containers) from a container platform that extract metadata from specific artifacts (e.g., file system artifacts, operating system artifacts, application artifacts, etc.). The output of the container processing is structured data in an industry standard data format (e.g., CSV, JSON, XML, YAML, etc.).

In step 230, the structured data may be staged and enriched. In one embodiment, the structured data may be transferred to, ingested by, and enriched by a SIEM platform and a data analytics platform. In general, data indexing may be based on the fields of the data formats (e.g., CSV, JSON, XML AND YAML). The data enrichment may involves adding additional contextual metadata to data objects based on pre-defined logic.

In step 240, the enriched data on the SIEM platform may be analyzed. In one embodiment, the data on the SIEM platform and the data analytics platform may be searched via exploratory data analysis.

In one embodiment, a subset of the data may be processed by a data analysis pipeline, which is a series of analytical tasks that may be performed within, for example, the SIEM platform. The data analysis pipeline tasks may include, for example, the construction of event timelines from time-series data, the identification of outliers from statistical charting of the data, the identification of suspicious events based on known indicators of compromise (IOCs), the identification of suspicious events based on known patterns, etc.

In one embodiment, machine learning models may be applied to the data on the data analytics platform to identify suspicious events that may contain unknown indicators and originate from unknown patterns. An example of such is using a custom supervised machine learning model to graph the relationships between events thereby highlighting suspicious events and events that may be related to the suspicious events.

Other variants of machine learning models may be applied using the data analytics platform as is necessary and/or desired.

In step 250, reporting may be performed. In one embodiment, predefined or ad-hoc reports may be generated from a subset of the data by the SIEM platform. Generated reports may represent data in different visual forms including, for example, statistical tables and charts, geospatial charts, time series tables and charts, etc. For example, a type of report "program executions and persistence" may be generated based on data points that are indicative of programs that have run (or have been executed) and data points that indicate persistence—which are methods for program executions to survive a reboot and/or to maintain a running state given a certain set of conditions. As another example, a type of report "file system meta distribution" may be generated based on the distribution of attribute types for file system data to identify outlier file system attributes that may be used to hide information. As still another example, a type of report "Windows logon activity" may be generated based on Windows events that may be used to show when a particular user had accessed a particular system. These and many other use case specific reports may be generated.

Figure 3:
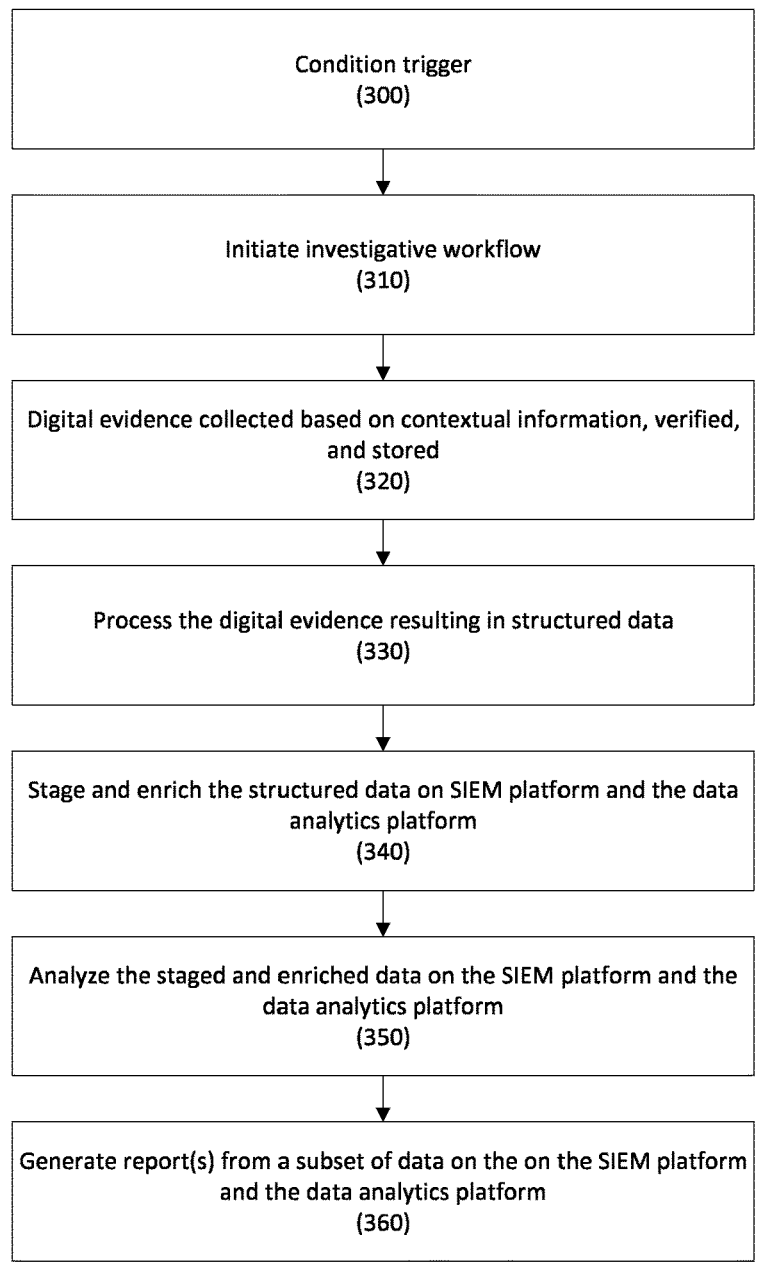
FIG. 3 depicts a method for scheduled and condition triggered investigation workflows according to one embodiment.

Referring to FIG. 3, a method for scheduled and condition triggered investigation workflows is provided according to one embodiment.

In step 300, a condition is triggered. According to one embodiment, the condition trigger may be time based, such as being triggered on a predefined schedule. In another embodiment, the condition trigger may be logic based, such as being triggered by code on the orchestration platform exposed by API and called by event handlers on the control plane.

In step 310, the automated triggered condition starts the initiation of the investigative workflow. In one embodiment, the orchestration platform may instrument the case management system to initiate the workflow. As part of the workflow initiation, the orchestration platform may capture the condition(s) that triggered the workflow initiation and records that as contextual information. Other contextual information that may be captured may include asset, subject, threat and related events data, etc. The contextual information may also contain relevant metadata such as the case, asset, subject, threat, and related events data.

In step 320, digital evidence may be collected from the assets as specified in the contextual information, and may be processed, resulting in digital evidence. This may be similar to step 210, above.

In step 330, the digital evidence may be processed. This may be similar to step 220, above.

In step 340, the structured data may be staged and enriched. This may be similar to step 230, above.

In step 350, the data may be analyzed. This may be similar to step 240, above.

In step 360, reporting may be performed. This may be similar to step 250, above.

Although multiple embodiments have been disclosed, it should be recognized that these embodiments are not mutually exclusive, and features from one may be used with another.

Hereinafter, general aspects of implementation of the embodiments will be described.

Embodiments of the invention or portions of thereof may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for conducing cyber investigations, comprising:
   in an information processing apparatus comprising at least one computer processor:
      receiving initiation of an investigative workflow comprising contextual information for an event including a cyber investigative case, a cyber investigative subject, and/or a cyber investigative threat, wherein the initiation comprises a logic-based triggering event;
      collecting digital evidence for the event from an electronic data asset in a standard digital evidence format;
      generating an acquisition cryptographic hash of the collected digital evidence;
      storing the acquisition cryptographic hash with a timestamp of collection as collection metadata in an evidence tracking system;
      formatting, by a plurality of virtualized containers, the digital evidence into structured data in standardized data format;
      adding contextual data to data objects in the structured data based on a context of the data objects, wherein the contextual data comprises an indication of the logic-based triggering event, and a file system artifact, an operating system artifact, and/or an application artifact;
      analyzing the structured data and the contextual metadata by searching the structured data using exploratory data analysis; and
      generating at least one report based on the analysis, the at least one report comprising a timeline for the event constructed from time-series data.

2. The method of claim 1, wherein the electronic data asset comprises an end point system comprising an agent that interacts with an end point detection and response system.

3. The method of claim 2, wherein the end point detection and response system instruments the collection from the electronic data asset and stores the collected data in an archive file format in an evidence storage system.

4. The method of claim 1, further comprising:
   regenerating a cryptographic hash of the collected digital evidence on a subsequent access, and comparing the regenerated cryptographic hash to the acquisition cryptographic hash.

5. The method of claim 1, wherein the step of analyzing the structured data and the contextual metadata comprises correlating the structured data across data sets.

6. The method of claim 1, further comprising:
   identifying outliers in the data using statistical charting of the structured data.

7. The method of claim 1, further comprising:
   identifying a suspicious event based on known indicators of compromise (IOCs).

8. The method of claim 1, further comprising:
   identifying a suspicious event based on a known pattern.

9. The method of claim 1, further comprising:
   using machine learning to identify suspicious events that contain unknown indicators and originate from unknown patterns.

10. A system for conducing cyber investigations, comprising:
    a plurality of data assets;
    a plurality of virtualized containers;
    a Security Information and Event Management ("SIEM") platform;
    a data analytics platform;
    a data analysis pipeline;
    an evidence tracking system; and
    an orchestration platform comprising at least one computer processor:
    wherein:
       the orchestration platform receives initiation of an investigative workflow comprising contextual information for an event including at least one of a case, at least one of the data assets, a subject, and a threat, wherein the initiation comprises a logic-based triggering event;
       the orchestration platform collects digital evidence from the data asset in a standard digital evidence format;
       the orchestration platform generates an acquisition cryptographic hash of the collected digital evidence;
       the orchestration platform stores the acquisition cryptographic hash with a timestamp of collection as collection metadata in the evidence tracking system;

the virtualized containers format the digital evidence into structured data in a standardized data format;

the SIEM platform and the data analytics platform add contextual data to data objects in the structured data based on a context of the data objects, wherein the contextual data comprises an indication of the logic-based triggering event, and a file system artifact, an operating system artifact, and/or an application artifact;

the data analysis pipeline analyzes the structured data by searching the structured data using exploratory data analysis; and the orchestration platform generates at least one report based on the analysis, the at least one report comprising a timeline of the event constructed from time-series data.

11. The system of claim 10, further comprising:
an end point detection and response system; and
an evidence storage system;

wherein the data asset comprises an agent that interacts with the end point detection and response system, and the end point detection and response system instruments the collection from the data assets and stores the collected data in an archive file format in the evidence storage system.

12. The system of claim 10, wherein the orchestration platform regenerates a cryptographic hash of the collected data on a subsequent access, and compares the regenerated cryptographic hash to the acquisition cryptographic hash.

13. The method of claim 1, wherein the standard digital evidence format comprises an AD1 format or a L01 forensic evidence format.

14. The system of claim 10, wherein the standard digital evidence format comprises an AD1 format or a L01 forensic evidence format.

* * * * *